(12) United States Patent
Herman et al.

(10) Patent No.: US 7,208,246 B2
(45) Date of Patent: *Apr. 24, 2007

(54) FUEL CELL WITH INTEGRATED HEATER AND ROBUST CONSTRUCTION

(75) Inventors: Gregory S Herman, Albany, OR (US);
David Champion, Lebanon, OR (US);
James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

This patent is subject to a terminal disclaimer.

(21) Appl. No.: 10/202,034

(22) Filed: Jul. 23, 2002

(65) Prior Publication Data

US 2004/0018406 A1    Jan. 29, 2004

(51) Int. Cl.
*H01M 2/16* (2006.01)
*H01M 2/14* (2006.01)

(52) U.S. Cl. .................... 429/143; 429/38; 429/39
(58) Field of Classification Search ............. 429/143, 429/39, 38, 26, 30, 34
See application file for complete search history.

(56) References Cited

U.S. PATENT DOCUMENTS

| | | | |
|---|---|---|---|
| 4,248,941 A | 2/1981 | Louis et al. | |
| 4,396,480 A * | 8/1983 | Hegedus et al. | 429/33 |
| 5,543,239 A * | 8/1996 | Virkar et al. | 429/33 |
| 5,985,113 A * | 11/1999 | Crome et al. | 205/343 |
| 6,258,474 B1 | 7/2001 | Diethelm et al. | |
| 6,472,093 B2 * | 10/2002 | Faris et al. | 429/27 |
| 6,638,654 B2 * | 10/2003 | Jankowksi et al. | 429/26 |
| 6,641,948 B1 * | 11/2003 | Ohlsen et al. | 429/44 |
| 6,740,444 B2 * | 5/2004 | Leban | 429/41 |
| 6,824,911 B2 * | 11/2004 | Franklin | 429/38 |
| 2002/0012825 A1 * | 1/2002 | Sasahara et al. | 429/30 |
| 2002/0068202 A1 * | 6/2002 | Gebhardt et al. | 429/13 |
| 2003/0012994 A1 * | 1/2003 | Kushibiki et al. | 429/30 |

FOREIGN PATENT DOCUMENTS

| | | |
|---|---|---|
| DE | 19757320 | 1/1999 |
| DE | 19914681 | 10/2000 |
| JP | 8-106916 | 4/1996 |
| JP | 8-195206 | 7/1996 |
| JP | 8-264195 | 10/1996 |
| JP | 2000243412 | 9/2000 |
| WO | WO 00/45457 | 8/2000 |
| WO | WO 01/37357 | 5/2001 |

\* cited by examiner

*Primary Examiner*—Patrick Joseph Ryan
*Assistant Examiner*—Ben Lewis (57) ABSTRACT

A fuel cell assembly including a substrate and an electrolyte disposed on the substrate and having a rib projecting out from the substrate. The rib has first and second side surfaces and a top surface. An anode is disposed on the first side surface and a cathode is disposed on the second side surface. The fuel cell also includes a resistive heater disposed at a location selected from the anode, the cathode, within the electrolyte, between the rib and the substrate, and any combination of these.

27 Claims, 10 Drawing Sheets

FUEL CELL WITH INTEGRATED HEATER AND ROBUST CONSTRUCTION

FIELD OF THE INVENTION

This invention relates to stack configuration and heating mechanisms for fuel cells.

BACKGROUND OF THE INVENTION

Solid oxide fuel cells (SOFC) typically operate at temperatures in excess of 800° C. Elevated temperatures increase catalytic reaction rates and ion transport through a solid electrolyte in the fuel cell. Typical fuel cells are heated by an external heater that heats the fuel to a temperature sufficient for catalysis. The heat from the exothermic reaction further increases the cell's operating temperature to an optimal level. However, the time required for sufficient amounts of heated fuel and air to pass through the fuel cell stack and heat the cell elements to a level where the catalytic reactions are self-sustaining reduce the efficiency of the cell and waste fuel. As a result, it is desirable to have a more efficient method of heating the fuel cell stack.

Fuel cells are produced with both dual-chamber and single-chamber designs. Air and fuel are introduced to a dual-chamber system separately. In the dual-chamber design, the cathode is exposed only to air, and the anode is exposed only to fuel. The electrolyte is gas-tight, only permitting oxygen ions, not electrons, to pass through. As fuel cells become smaller, the electrolyte membrane becomes thinner, decreasing the resistance for the transfer of oxygen ions from the cathode to the anode. However, thinner membranes also exhibit decreased mechanical stability. They are also more difficult and expensive to manufacture, and the necessity for a gas-tight electrolyte further increases the complexity and expense of the dual-chamber design.

Single-chamber fuel cells eliminate some of these problems. Fuel and air are introduced to both the anode and the cathode surfaces as a mixture, obviating a gas-impermeable electrolyte membrane (Hibino, *Science*, 2000, 288:2031). However, enabling use of a fuel-air mixture does not solve the mechanical difficulties of the single-chamber device. The need for mechanical robustness decreases the available surface area of the electrolyte and catalysts, further decreasing the power output per unit area. In addition, it is difficult to reduce fuel usage or system temperature during low power demand without reducing system efficiency. As a result, it is desirable to have a fuel cell design that increases catalytic surface area while maintaining mechanical stability.

SUMMARY OF THE INVENTION

The invention is a fuel cell assembly including a substrate and an electrolyte disposed on the substrate and having a rib projecting out from the substrate. The rib has first and second side surfaces and a top surface. An anode is disposed on the first side surface and a cathode is disposed on the second side surface. The fuel cell also includes a resistive heater disposed at a location selected from the anode, the cathode, within the electrolyte, between the rib and the substrate, and any combination of these.

BRIEF DESCRIPTION OF THE DRAWING

The invention is described with reference to the several figures of the drawing, in which.

DETAILED DESCRIPTION OF THE PREFERRED EMBODIMENT

The invention includes a fuel cell assembly including a substrate, an electrolyte disposed on the substrate, an anode, and a cathode. The electrolyte includes a rectangular rib projecting perpendicular to the substrate and comprising first and second side surfaces and a top surface. The anode is disposed on the first side surface, and the cathode is disposed on the second side surface. The electrolyte may comprise a plurality of parallel trenches defining a plurality of rectangular ribs. Each trench has a bottom surface disposed within the electrolytes, and the assembly further includes a plurality of cathodes and anodes disposed on the bottom surface and adjacent side surfaces of alternating trenches. The invention also includes a fuel cell comprising an anode, a cathode, and an electrolyte interposed between them. A heater is disposed within the electrolyte, anode, cathode, and/or substrate.

Figure 1A:
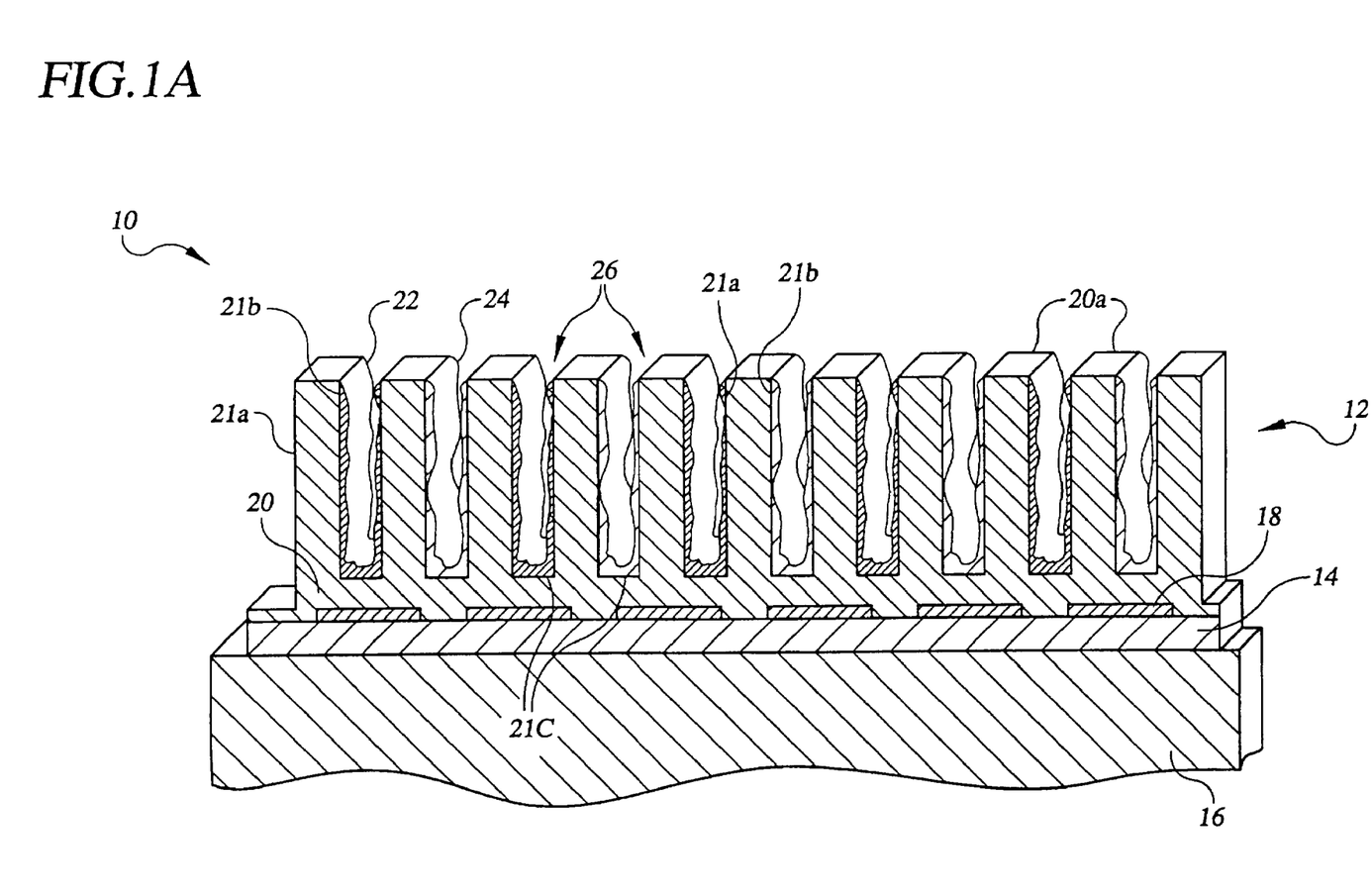
FIG. 1A is a schematic view of a portion of a fuel cell according to one embodiment of the invention.

The invention exploits modern semiconductor fabrication techniques such as thin film deposition, photolithography, patterning, anisotropic or isotropic etching. Exemplary fuel cells according to the invention have electrodes deposited in trenches along a vertically oriented electrolyte (FIG. 1A). The vertical alignment permits a greater electrode surface area per substrate surface area covered and increases mechanical stability with respect to thermal or mechanical shock, pressure gradients in the fuel and air stream, and thermal stress. The thinness of the electrolyte is limited only by the resolution of the lithographic process and the method used to form the trenches (e.g., isotropic and anisotropic etching, sacrificial materials, etc.). The thin electrolyte facilitates surface diffusion across the top of the electrolyte "walls" and reduces the ionic impedance, reducing the resistance to anion mobility through the bulk of the electrolyte. In addition, the electrolyte structure increases the catalytic surface area per surface area of substrate. The fuel cell construction thus enables reduced operating temperatures and increases power generation.

Figure 1B:
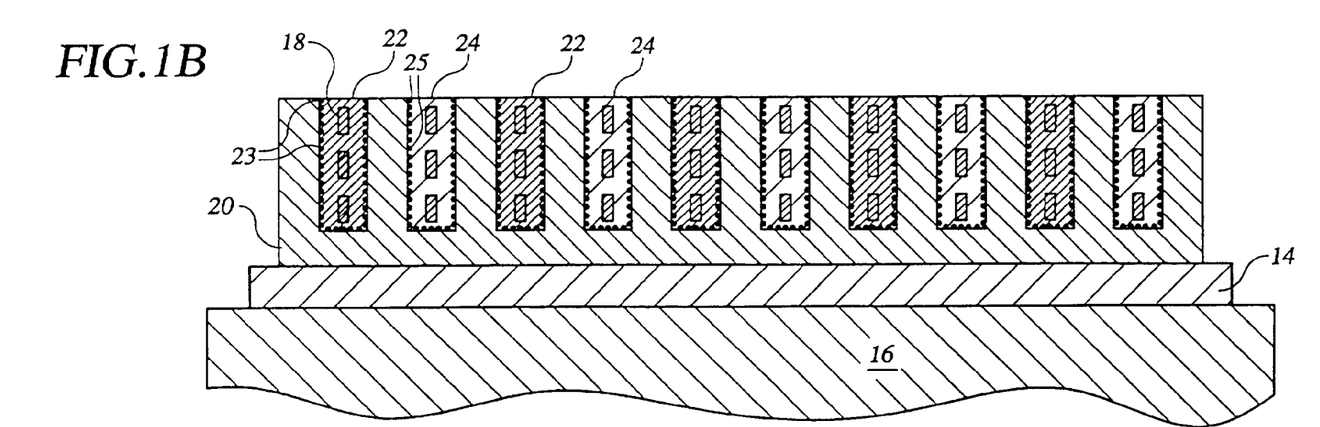
FIG. 1B is a cross-section of a portion of a fuel cell according to an alternative embodiment of the invention.

FIG. 1A illustrates a high-density electrode design for a fuel cell with an integrated heater according to one embodiment of the invention. The fuel cell 10 includes a stack 12 deposited on a low thermal conductivity layer 14. The low thermal conductivity layer 14 separates the fuel cell stack 12 from substrate 16. Substrate 16 may include standard substrate materials such as silicon or other materials that may be processed by photolithography and standard etching techniques. A thermally resistive material is deposited and patterned on top of the low thermal conductivity ceramic material 14. Electrolyte 20 is deposited, first in the spaces between resistors 18 and then in a layer on top of resistors 18. Trenches are etched out of the electrolyte 20 to define ribs 20a. Each rib has first and second sides 21a and 21b, and adjacent ribs define a trench having bottom 21c. Thus, each trench is defined by two ribs 20a and is bounded by the second side 21b of one rib and the first side 21a of the next. The second side 21b of one rib, trench bottom 21c and first side 21a of the next rib are coated with the appropriate material to form alternating cathodes 22 and anodes 24. The cathode 22 and anode 24 materials are deposited on the sides of the trenches 26, increasing the surface area available to fuel and air flowing through the fuel cell stack. Thus, the fuel cell, as viewed from above, is a set of parallel furrows in the electrolyte with the sidewalls of alternating rows coated with anode 24 and cathode 22 materials. In an alternative embodiment, the trenches are filled with a porous material that acts as the electrode, as shown in FIG. 1B.

Figure 1C:
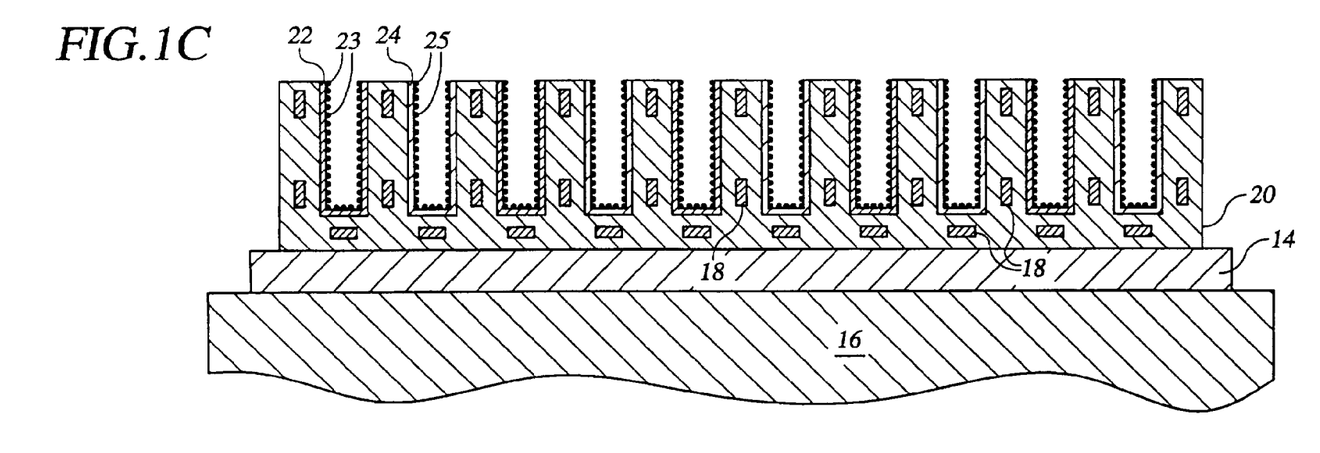
FIG. 1C is a cross-section of a portion of a fuel cell according to an alternative embodiment of the invention.
Figure 1D:
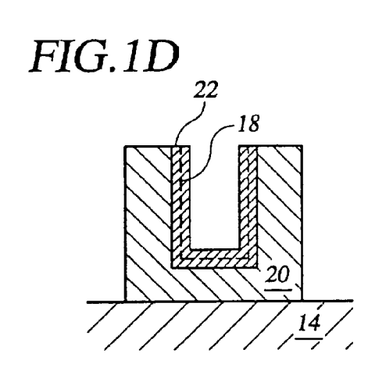
FIG. 1D is a cross-section of a portion of a fuel cell showing an alternative configuration for an integrated heater according to an embodiment of the invention.
Figure 1E:
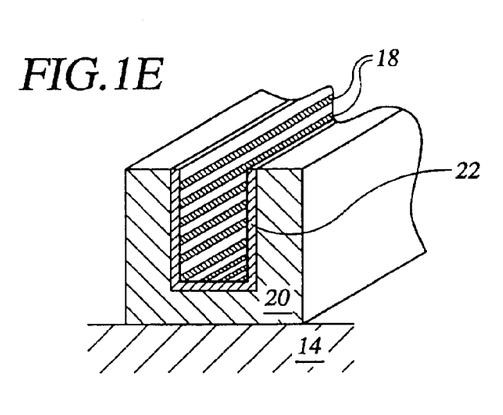
FIG. 1E is a schematic view of a portion of a fuel cell showing an alternative configuration for an integrated heater according to an embodiment of the invention.
Figure 1F:
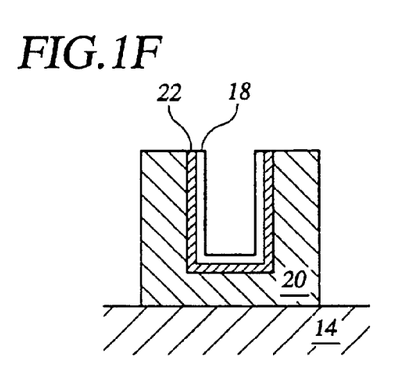
FIG. 1F is a cross-section of a portion of a fuel cell showing an alternative configuration for an integrated heater according to an embodiment of the invention.
Figure 1G:
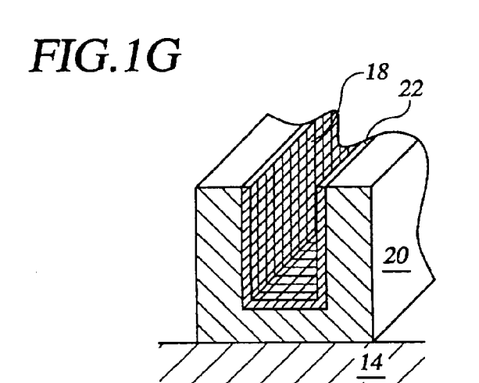
FIG. 1G is a schematic view of a portion of a fuel cell showing an alternative configuration for an integrated heater according to an embodiment of the invention.
Figure 1H:
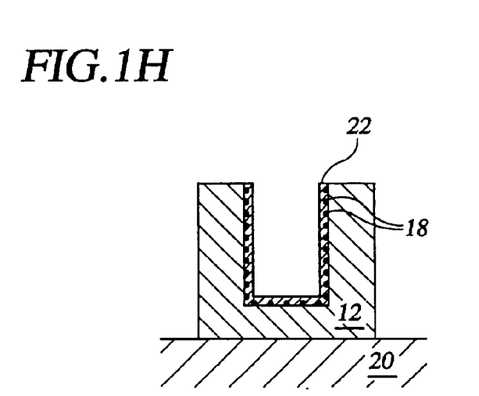
FIG. 1H is a cross-section of a portion of a fuel cell showing an alternative configuration for an integrated heater according to an embodiment of the invention.

Alternatively, or in addition, the heater may be disposed within the ribs 20a (FIG. 1C), the base portion of electrolyte 20 (FIG. 1C), or the electrodes (FIGS. 1B and 1D), or some combination of these. The heater may also be deposited as a coating on the electrodes. Use of thin strips (FIG. 1E), a porous material (FIG. 1F), or a mesh (FIG. 1G) will enable gases to reach the catalytic surface. Thin strips or a mesh may also be disposed within the electrode (FIG. 1D) or between the electrodes and electrolyte (FIG. 1H). Cathode current collectors 23 and anode current collectors 25 may be integrated on top of the cathode and anode films, inside the cathode and anode films, or between the electrolyte and electrodes using configurations similar to those shown for the heater in FIGS. 1B, D, E, F, G, and 1H. For example, current collectors may be disposed at the electrolyte/electrode interface (FIG. 1B) or at the surface of the electrode (FIG. 1C). The current collectors may be a porous material that allows diffusion of gases to the surface of the electrode while conducting current.

The design provided by the invention also eases manufacturing and reduces fabrication costs. The fuel cell can be produced with fewer process steps and standard production processing tools. Elimination of a gas-tight freestanding membrane reduces constraints on materials and manufacturing handling; furthermore, the robust electrode increases yield. To fabricate the fuel cell, the low thermal conductivity ceramic material, e.g., alumina, is deposited on a substrate, e.g., silicon. The resistor, e.g., platinum, is then deposited on the thermal insulator. The resistor material is chosen not only to withstand elevated temperature but also to resist corrosion by airborne gases such as oxygen and sulfur. The electrolyte is deposited over the resistor. Exemplary electrolyte materials include samarium-doped ceria (SDC), gadolinium-doped ceria (GDC), yttrium-stabilized zirconia (YSZ), and magnesium- and strontium-doped lanthanum gallate (LSGM). The trenches are formed by etching or other techniques and the anode and cathode materials deposited. Exemplary cathode materials include samarium strontium cobaltite, gadolinium strontium cobaltite, and lanthanum strontium iron cobaltite. Exemplary anode materials include Ni-SDC, Cu-SDC, Ni-GDC, Cu-GDC, and Ni-YSZ. One skilled in the art will be familiar with a variety of conformal deposition techniques that may be exploited to fabricate fuel cells according to the invention. For example, gas phase processes such as CVD and atomic layer CVD or solution phase methods such as dipping and various electrochemical techniques may be used.

Figure 2:
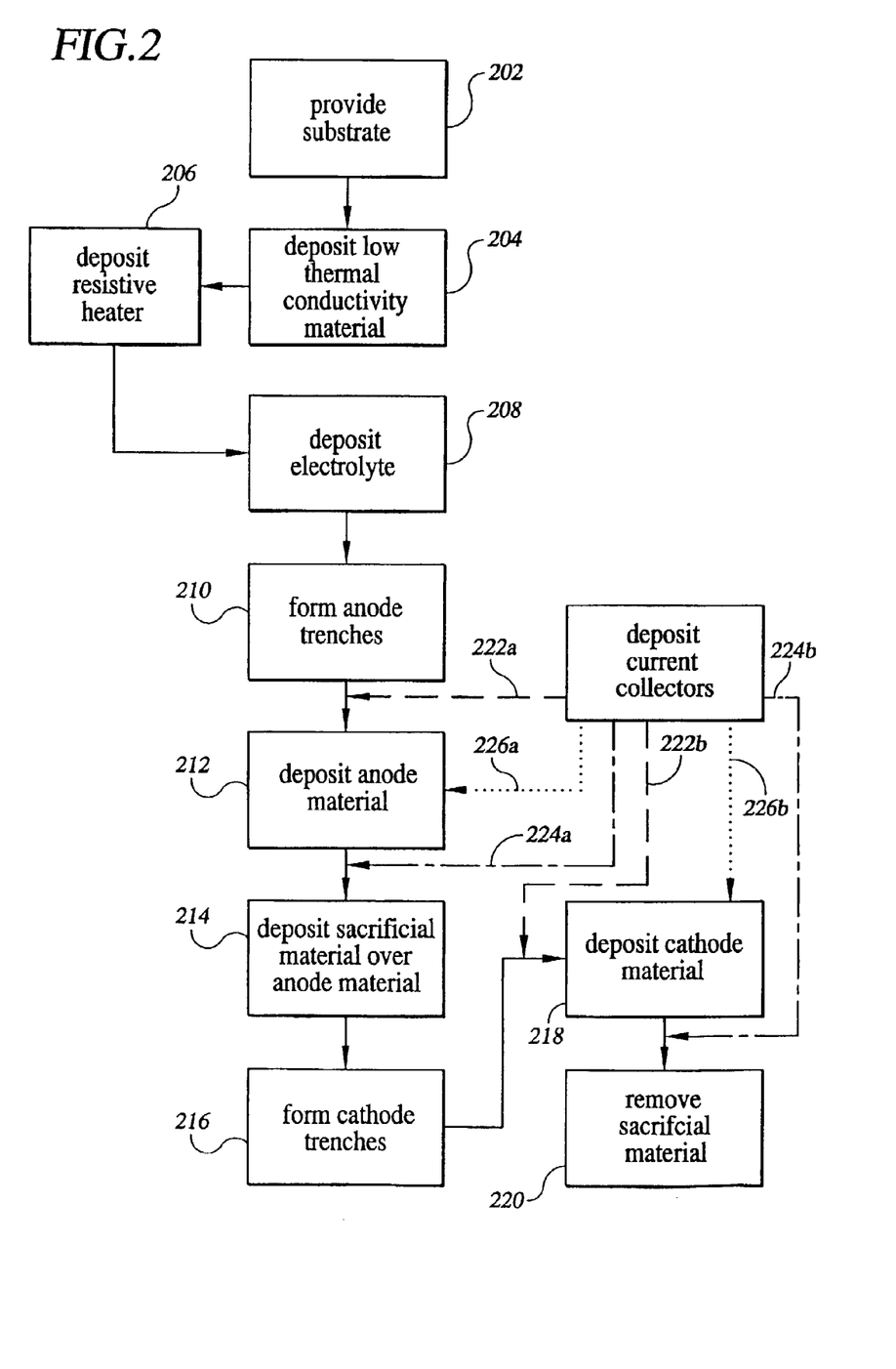
FIG. 2 is a flow chart illustrating a method of making a fuel cell according to an embodiment of the invention.

To produce a fuel cell according to one embodiment of the invention (FIG. 2), a substrate is provided 202 and a low thermal conductivity material deposited thereon 204. A resistive heater is deposited 206, followed by an electrolyte 208. The anode trenches are formed 210 and the anode material is deposited 212. A sacrificial material is used to fill the anode trenches and cover the anode material 214. The cathode trenches are then formed 216 and the cathode material is deposited 218. Finally, the sacrificial material is removed from the anode trenches 220. The current collectors may be deposited before the anode and cathode materials 222a–b, after the electrode materials 224 a–b, or as a layer within the electrode materials 226a–b. One skilled in the art will recognize that the cathodes may be deposited first, followed by the anodes, if desired.

This design enables a high surface area. The fuel cell preferably has an electrode surface area of at least 1 cm$^2$ per square centimeter of substrate and more preferably 2 cm$^2$ per square centimeter of substrate. In one embodiment, if the depth of the trenches 26 is 2 µm, with a trench width of 0.5 µm and electrolyte "walls" 0.5 µm in width, then the total length of a repeat unit in the fuel cell stack is 2 µm. Thus, there are 5,000 cells per linear centimeter. The area of the trench bottoms is given by $$\text{trench width} * \text{length} * \text{number of cells} \tag{1}$$

$$0.5 \text{ µm} * \text{length} * 5000/\text{cm} \tag{2}$$

or 0.25 cm$^2$ per square centimeter of substrate. The area of the trench side is $$\text{trench depth} * \text{length} * 2 * \text{number of cells} \tag{3}$$

$$2.0 \text{ µm} * \text{length} * 2 * 5000/\text{cm} \tag{4}$$

because each trench has two sides, or 2.0 cm$^2$ per square centimeter of substrate. Thus, the total electrode area is 2.25 cm$^2$ per square centimeter of substrate.

Figure 3:
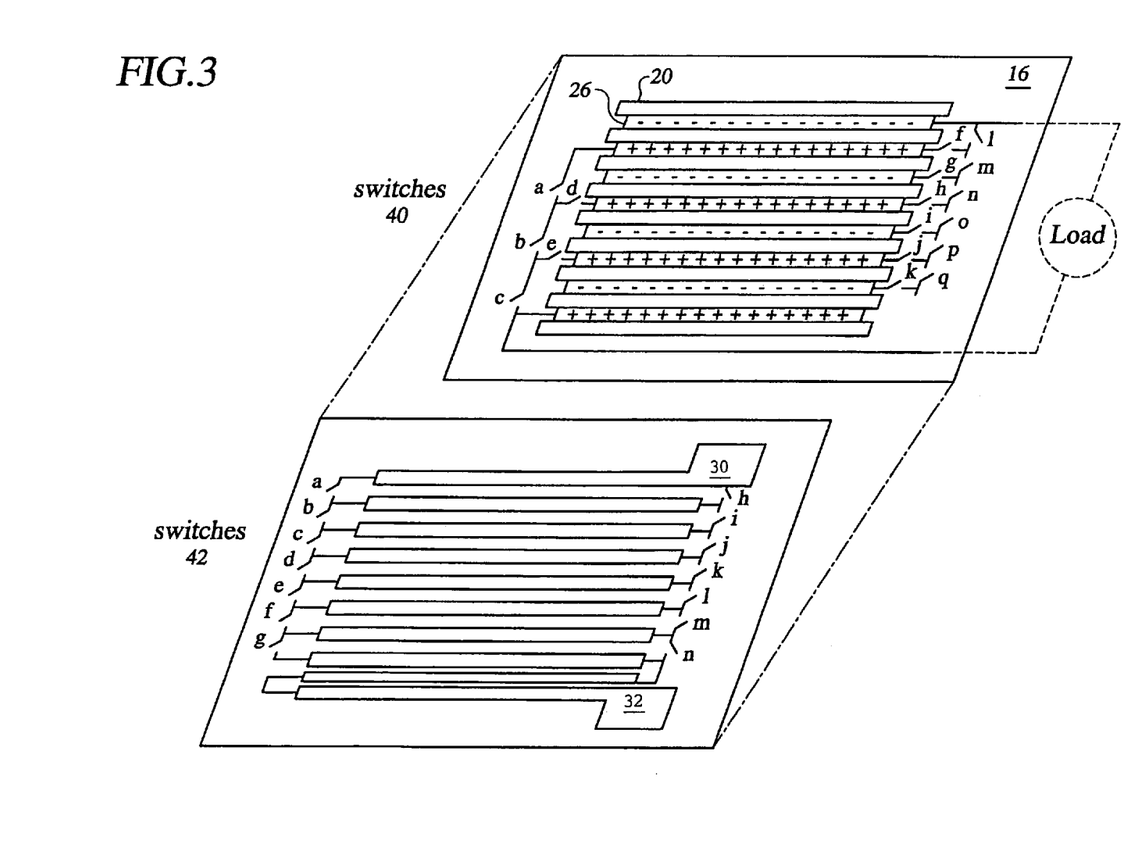
FIG. 3 is a schematic of a fuel cell stack and an underlying resistor according to an embodiment of the invention.

As viewed from above, the fuel cell stack is formed by a series of electrolyte "walls" and trenches 26, as shown in FIG. 3. The resistor 18 is distributed underneath the fuel cell stack in long strips paralleling the channels defined by the electrolyte. Current is applied to the resistor 18 through contacts 30 and 32. Heat is conducted from the resistor 18 through the electrolyte 20 to the catalytic surfaces 22 and 24.

The stack design also provides flexibility for optimizing current and voltage levels and power management. The cells may be interconnected for both series and parallel operation to increase voltage and current, respectively. The large number of cells also enables a greater range of current excursion by allowing some cells to be electronically disconnected. Those cells that remain connected would continue to operate at their maximum efficiency when current demand is low. In contrast, to reduce power from a single cell system, either the temperature or fuel delivery would be reduced, lowering efficiency.

Figure 4A:
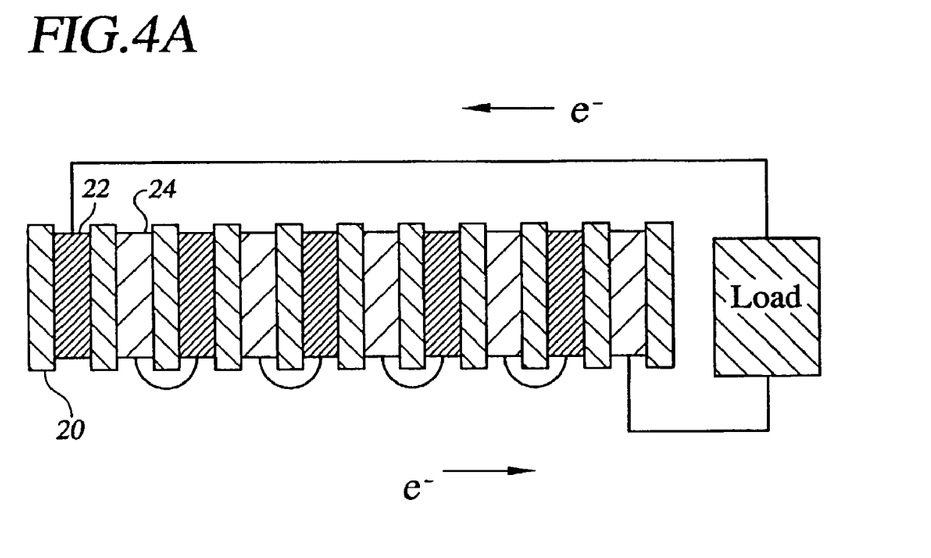
FIG. 4A is a schematic of a fuel cell stack connected in series for use with an embodiment of the invention.
Figure 4B:
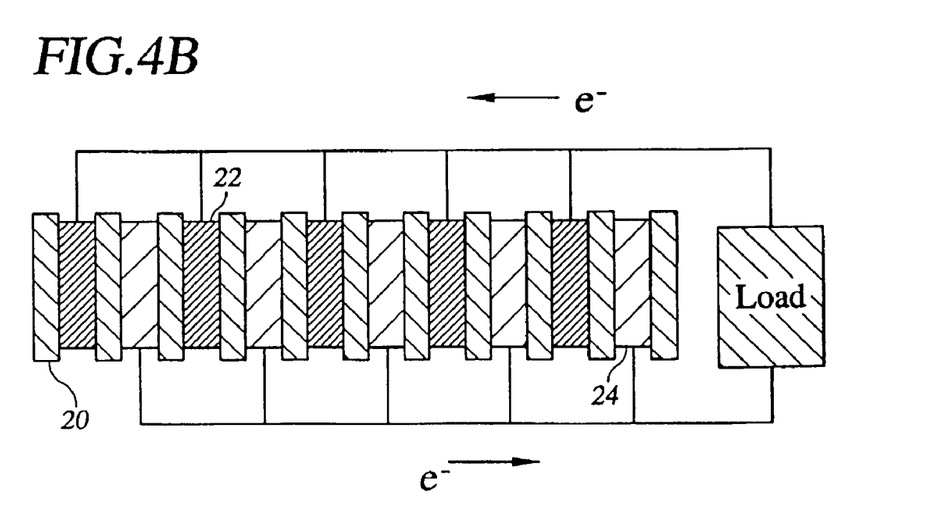
FIG. 4B is a schematic of a fuel cell stack connected in parallel for use with an embodiment of the invention.

The anode and cathode surfaces may be connected in either series or parallel, as shown in FIGS. 4A and B. A series circuit increases the voltage delivered by the fuel cell stack, while a parallel circuit increases the current delivered by the cell. Alternatively, as shown in FIG. 3, the circuitry may be provided to connect a single fuel cell in either series or parallel, with a set of switches 40 provided to determine in which configuration the current will run. The switches also enable parts of the stack to be turned off at times of low demand. Similar switches 42 disposed in the circuit controlling resistor 18, will also turn off the heater for the parts of the circuit that are not in operation.

FIG. 3 shows the heater and fuel cell circuits stacked on top of one another. Switches 40 can be arranged to configure the fuel cell in either series or parallel. To connect the fuel cell in series switches 40*a–e* should be open. Switches 40*l, n,* and *p* should also be open; the remaining switches should be closed. To connect the fuel cell in parallel, switches 40*f, h,* and *j* should be open; the remaining switches should be closed. The switches can also be controlled to connect only portions of the fuel cell. For example, closing switches 40*k–q* will connect the lowermost unit cell of the fuel cell. Further closing switches 40*i* and *j* while opening switch 40*p* will connect another unit cell in series. To connect two unit cells in parallel, switches k–q should be closed, along with switches 40*c, e,* and *i.*

Switches 42 enable resistor 18 to be connected in series. Selected portions of the 30 resistor may be heated by closing and opening the appropriate switches. For example, to heat the lowest pair of resistor elements, switches 42*h–n* should be closed. To add another row, switches 42*a–g* should be closed. The remaining switches should be open.

To add a fourth resistor element into the circuit, switches 42*g–m* are closed, while 42*a–f* and *n* are open. One skilled in the art will recognize how to configure the various switches 40 and 42 to turn on and heat specific portions of the fuel cell.

Figure 5A:
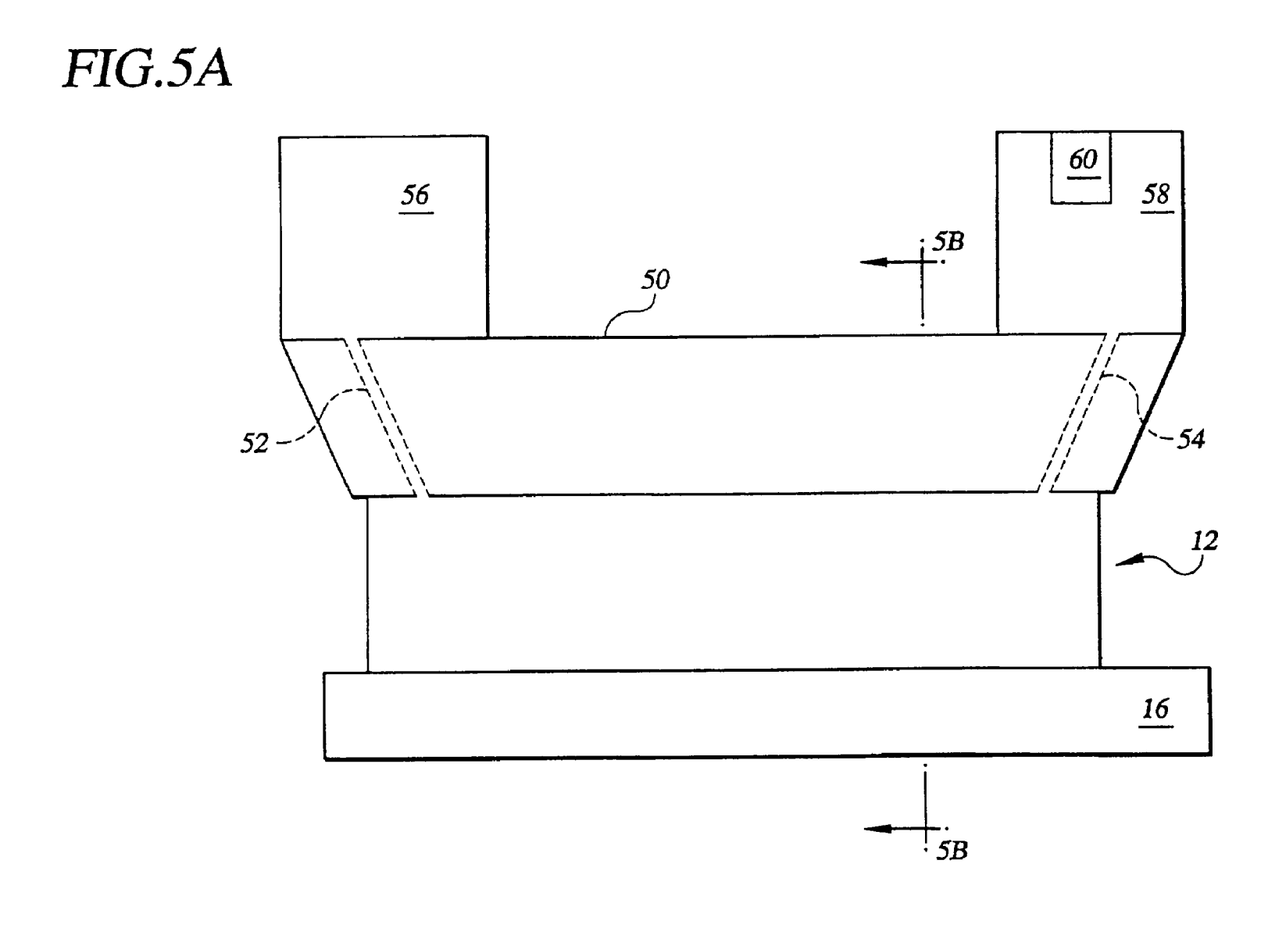
FIG. 5A is a side view of the fuel cell illustrated in FIG. 1A, showing how air and fuel are circulated through the stack, in which the plane of FIG. 5B is shown for reference along direction 5B.
Figure 5B:
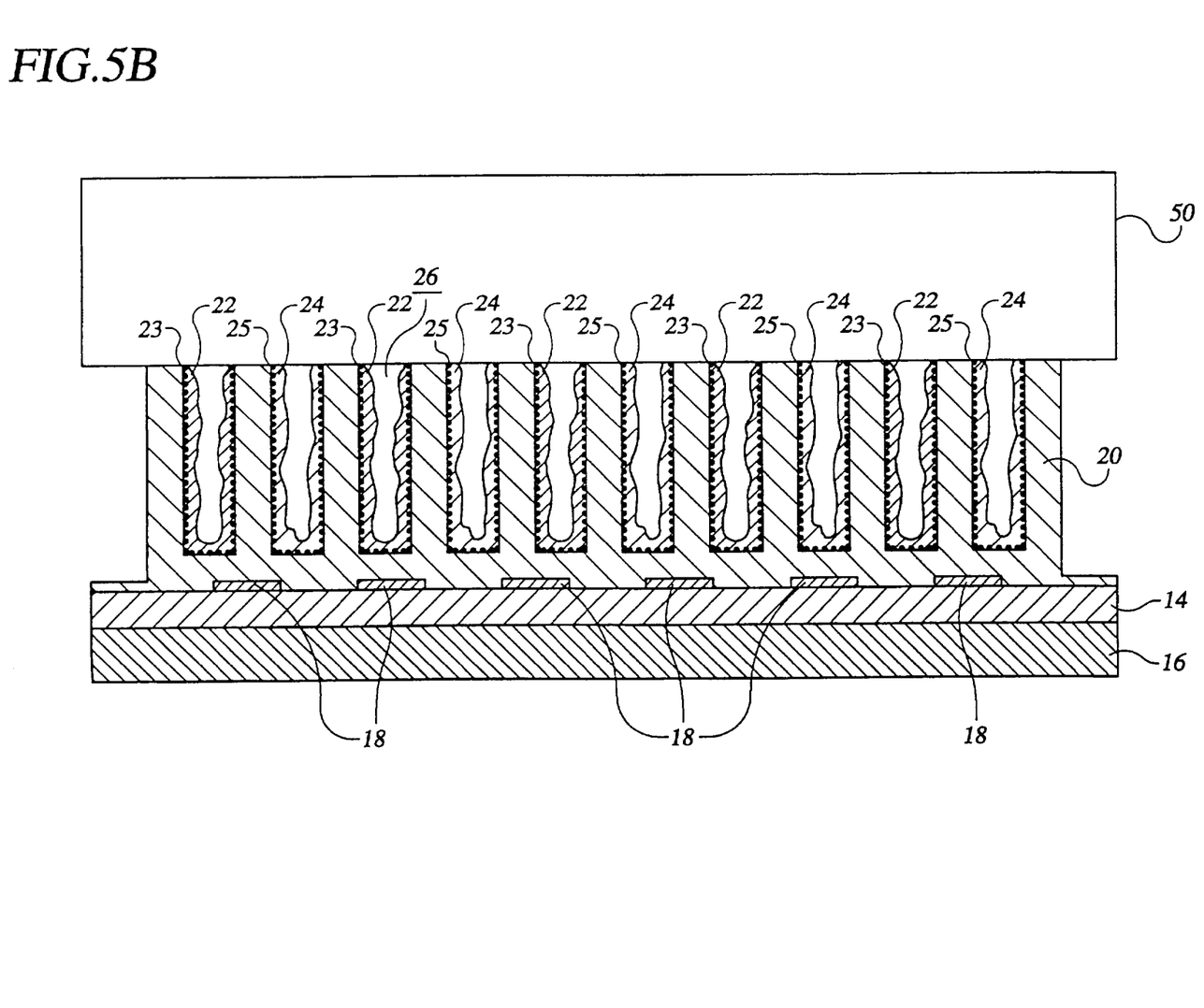
FIG. 5B is a schematic view of the fuel cell illustrated in FIG. 5A.

In one embodiment, an air/fuel mixture is delivered to the fuel cell stacks and water and/or $CO_2$ removed via a manifold 50 shown in FIGS. 5A and B, which are side views perpendicular to one another. The air/fuel mixture is delivered to the stacks through channel 52, and water vapor and other exhaust are removed through channel 54. FIG. 5B shows the manifold closing the trenches 26 between the channels 52 and 54. For portable devices, a replaceable or rechargeable reservoir 56 of fuel may be connected to channel 52. Such a reservoir may include a fuel reformer, depending upon the fuel. Exemplary fuel reformers are well known to those skilled in the art. The exhaust may be released to the environment or collected in a container 58 that may be emptied or removed as needed. Use of a condenser 60 to remove water vapor from the exhaust stream will reduce the amount of gas in such a container.

Figure 5C:
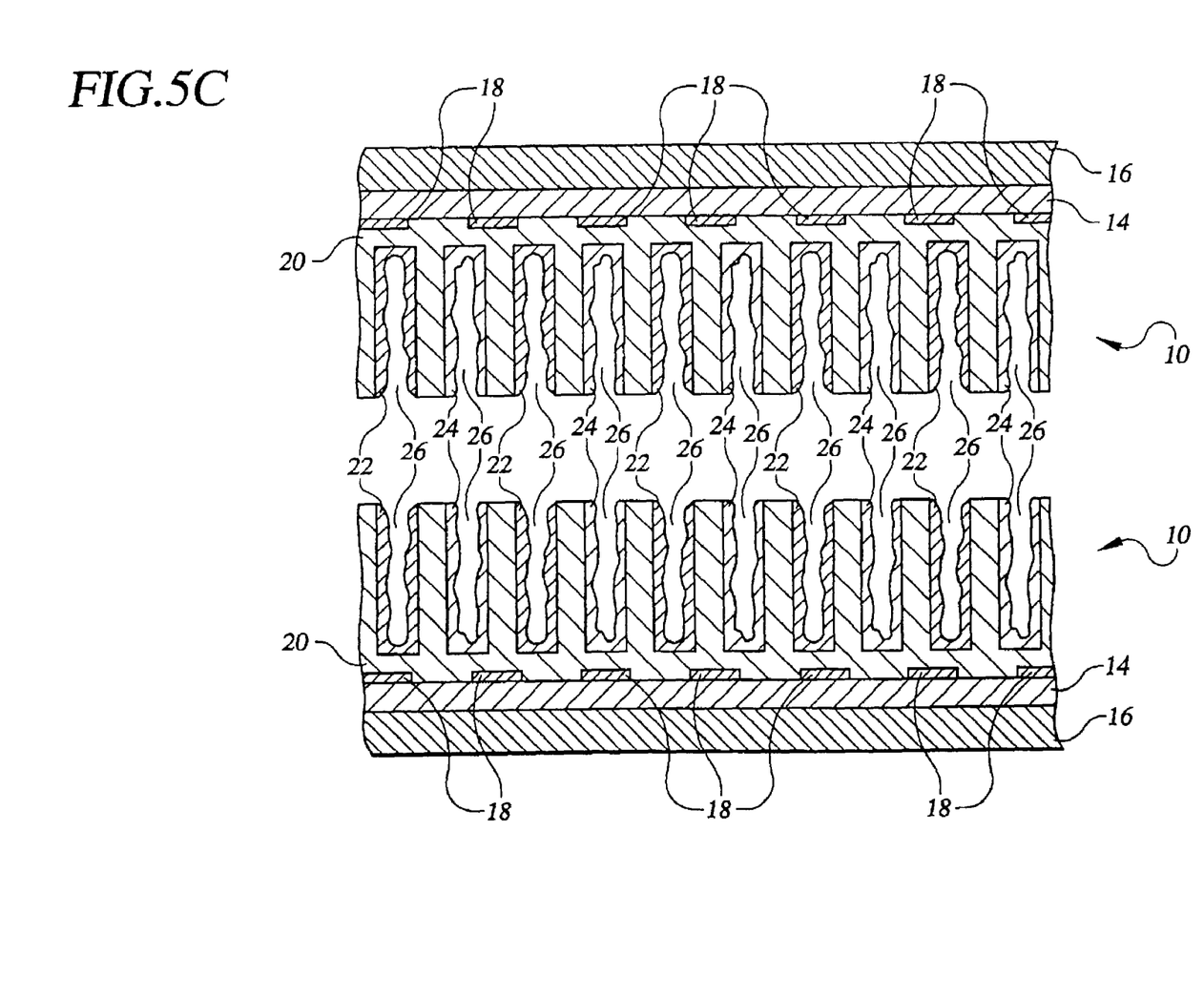
FIG. 5C is a cross-sectional view of an alternative embodiment of a fuel cell according to the invention.
Figure 5D:
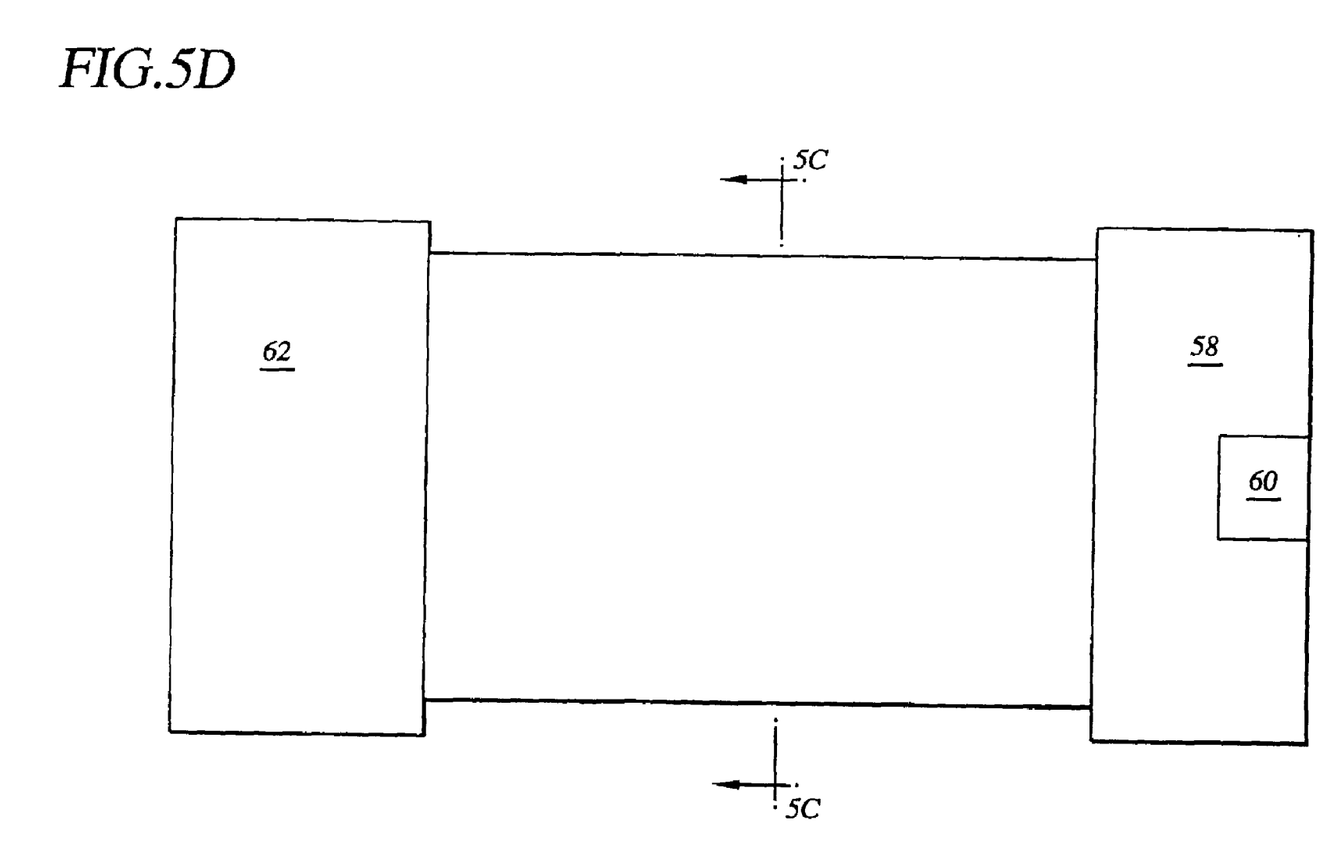
FIG. 5D is a schematic view of the embodiment depicted in FIG. 5C, in which the plane of FIG. 5C is shown for reference by line 5C.

In an alternative embodiment, two fuel cells 10 are mounted with the trenches facing one another, as shown in FIG. 5C. Air flows is delivered to the trenches from fuel source 62, which may include a reservoir, reformer, or other fuel conversion or storage devices known to those skilled in the art (FIG. 5D). Container 58 may be disposed at the opposite end of the paired fuel cells to collect the exhaust and may include a condenser 60.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A fuel cell assembly, comprising:
   a substrate;
   an electrolyte disposed on the substrate having a rib projecting out from the substrate, the rib having first and second side surfaces and a top surface that extends from the first side surface to the second side surface;
   an anode disposed on the first side surface;
   a cathode disposed on the second side surface; and
   a resistive heater disposed at a location selected from the anode, the cathode, within the electrolyte, between the rib and the substrate, and any combination of these.

2. The assembly of claim 1, further comprising a low thermal conductivity ceramic layer interposed between the electrolyte and the substrate.

3. The assembly of claim 1, further comprising an anode current collector and a cathode current collector, wherein the current collectors are disposed at locations selected from the group consisting of within the anode and cathode, between the electrolyte and the anode and cathode, and over the anode and cathode.

4. The assembly of claim 1, wherein the electrolyte has a plurality of parallel trenches defined by a plurality of ribs each having first and second side surfaces, and wherein each french has a bottom surface disposed within the electrolyte, and wherein the assembly further comprises a plurality of alternating cathodes and anodes extending from the second side surface of a rib, across the bottom surface of the adjacent trench, and along the first side surface of the subsequent rib.

5. The assembly of claim 4, wherein the electrolyte includes a base layer interposed between the projections and the substrate, and wherein the resistive heater is disposed in a location selected from the group consisting of within the base layer and between the substrate and the base layer.

6. The assembly of claim 4, wherein the resistive heater comprises a plurality of strips of resistive material connected in series.

7. The assembly of claim 4, further comprising a circuit adapted and constructed to connect the anodes and cathodes in a member of the group consisting of parallel and series.

8. The assembly of claim 7, further comprising a circuit adapted and constructed to allow the anodes and cathodes to be reversibly switched from a series circuit to a parallel circuit.

9. The fuel cell of claim 4, wherein the plurality of anodes and cathodes are adapted and constructed so that a portion of the anodes and cathodes are electrically detachable from the fuel cell, and wherein the heater is adapted and constructed to provide heat only to the anodes and cathodes that are not electrically detached.

10. The assembly of claim 4, further comprising a chamber from which the fuel cell receives fuel and a chamber into which waste gas passes from the fuel cell.

11. The assembly of claim 10, wherein the fuel and waste chambers are removable.

12. The assembly of claim 4, wherein the anodes and cathodes fill their respective trenches.

13. A power source, comprising:
a first assembly according to claim 4; and
a second assembly according to claim 4, wherein
each assembly has a trench side and a substrate side,
the power source is adapted and constructed to have the trench sides of the first and second assemblies facing each other, and
the trenches of the first and second assemblies are in fluidic communication with one another.

14. An electrical device, comprising:
the fuel cell assembly of claim 4;
a manifold having an inlet and an outlet, wherein fluid passing through the inlet may travel among the plurality of parallel trenches; and
a source of fuel in fluidic communication with the inlet.

15. The electrical device of claim 14, wherein the source of fuel is a reservoir characterized by a member of the group consisting of replaceable and rechargeable.

16. The electrical device of claim 14, further comprising an exhaust storage container in fluidic communication with the outlet and a condenser disposed in the exhaust storage container.

17. An electrical device using the fuel cell of claim 1 as a power source.

18. A fuel cell assembly, comprising:
a substrate;
an electrolyte disposed on the substrate having a plurality of ribs projecting away from the substrate and a plurality of trenches respectively located between adjacent ribs, each trench including a closed end that is closer to the substrate than the remainder of the trench and an open end that is further from the substrate than the remainder of the trench;
anodes respectively disposed in every other trench such that a trench without an anode is located adjacent to each trench with an anode;
cathodes respectively disposed in the trenches without anodes; and
resistive heaters disposed at locations selected from the anodes, the cathodes, within the elecrolyte, between the ribs and the substrate, and any combination of these.

19. A fuel cell assembly as claimed in claim 18, wherein the anodes and cathodes are formed from different materials.

20. A fuel cell assembly as claimed in claim 18, further comprising:
a low thermal conductivity ceramic layer interposed between the electrolyte and the substrate.

21. A fuel cell assembly as claimed in claim 18, further comprising:
anode current collectors and cathode current collectors respectively disposed at locations selected from the group consisting of within the anodes and cathodes, between the electrolyte and the anodes and cathodes, and over the anodes and cathodes.

22. A fuel cell assembly as claimed in claim 18, wherein the trenches are parallel to one another.

23. A fuel cell assembly as claimed in claim 18, wherein
the electrolyte includes a base layer interposed between the projections and the substrate, and
the resistive heater is disposed in a location selected from the group consisting of within the base layer and between the substrate and the base layer.

24. A fuel cell assembly as claimed in claim 18, wherein the resistive heaters comprise a plurality of strips of resistive material connected in series.

25. A fuel cell assembly as claimed in claim 18, further comprising:
a circuit adapted and constructed to connect the anodes and cathodes in a member of the group consisting of parallel and series.

26. A fuel cell assembly as claimed in claim 18, wherein the anodes and cathodes fill their respective trenches.

27. A power source, comprising:
a first cell assembly according to claim 18; and
a second fuel cell assembly according to claim 18, wherein
the power source is adapted and constructed to have the open ends of the trenches of the first and second assemblies facing each other and in fluidic communication with one another.

* * * * *